3,361,595
PROCESS OF MAKING AN IMPROVED FUEL CELL ELECTRODE
George J. Young and Talmage P. Bursh, Alfred, N.Y., assignors to Leesona Corporation, Cranston, R.I., a corporation of Massachusetts
No Drawing. Filed Jan. 23, 1961, Ser. No. 83,940
5 Claims. (Cl. 136—122)

This invention relates to improved fuel cell electrodes and more particularly to improved porous carbon electrodes which possess high structural strength per unit thickness and have a controlled porosity.

In low temperature fuel cells porous carbon electrodes have been employed to a large extent because of several advantages that they possess over sintered metallic electrode structures. Carbon electrodes have a high surface contact area and some degree of control of the porosity and surface area of the electrode can be maintained in their manufacture. The surface area can be governed by a proper choice of petroleum coke and binding agent as well as by employing gasification techniques during carbonization. Carbon electrodes as a practical matter are substantially less expensive than electrodes manufactured from carefully fractionated, sintered metal powders. Further, sintered metal powders often undergo chemical reaction with the oxidizing gas or some electrolytes of the fuel cell system and are ultimately consumed, whereas carbon electrolytes are substantially inert to chemical reaction under fuel cell operating conditions.

However, in spite of the several advantages of carbon electrodes for use in fuel cells they have a number of serious limitations. Porous carbon electrodes must be "wet proof" for effective operation and failure of the wet proof coating results in flooding of the electrode by the electrolyte, thereby decreasing the efficiency of the cell. Many wet proofing treatments suggested by the prior art provide films which are either unstable at higher temperatures or are slowly hydrolyzed by the electrolyte. Also, it has been found that because of the limited structural strength of thin carbon plates it is necessary to make carbon electrodes relatively thick. This greatly increases the difficulty of controlling the porosity. When such porous carbon plates are used with fuel and oxidizing gases containing inert impurities, the pores in the electrode become blocked with the inert gases resulting in concentration polarization at relatively low current densities.

Therefore, it is an object of the invention to provide a porous carbon electrode which has a relatively high structural strength per unit thickness.

It is another object of the invention to provide a porous carbon electrode which can be conveniently activated with a catalytic metal.

It is another object of the invention to provide porous carbon electrodes which are highly wet proof.

It is another object of the invention to provide a porous carbon electrode which can be employed as the anode of a fuel cell operated at high temperatures.

These and other objects of the invention will become apparent from the following detailed description with particular emphasis upon the examples.

The novel fuel cell electrodes of the instant invention are constructed by spraying a carbon black-binder mixture onto a metal screen and subsequently carbonizing the binder. The metal screen serves the dual role of acting as a support, thus lending mechanical stability to the electrode, and as an electrical conductor. Therefore, the metal screen employed must be capable of conducting an electrical current and should also be resistant to corrosion under operating fuel cell conditions. Screens found particularly effective were made from platinum, platinum-rhodium alloy, platinum-silver alloy, and stainless steel. However, any metal screen can be employed as long as it will conduct an electrical current and not corrode under operating fuel cell conditions.

Good results have been obtained using screens of from 10–325 mesh. However, the preferable mesh size for most fuel cells is in the range of from 100–200 mesh. As is apparent, the larger the spacing in the screen, the greater the build-up of carbon black and binder needed to obtain a coherent layer. Thus, if the pore diameter of the screen is relatively large, as for example when utilizing a 10 mesh screen, the final electrode must necessarily be relatively thick. For some fuel cell applications this is desirable. However, ordinarily the thinner porous carbon electrodes are more functional for most fuel cell applications.

The carbon black employed in making the carbon black-binder mixture ideally should be non-porous and of a relatively high surface area. Carbon blacks with surface areas of up to 1000 square meters per gram give good results. However, blacks having a surface area of as low as 15 square meters per gram provide operable electrodes. A number of carbon blacks are available commercially which are applicable in the present invention. It was found that Carbolac #2 manufactured by Godfrey L. Cabot, which is a fine material, Spheron #6 manufactured by Godfrey L. Cabot, which is a medium surface area material, and Thermax manufactured by R. T. Vanderbilt Co., a material which contains relatively coarse particles are particularly satisfactory.

The binder which may be used in the carbon black-binder mixture can be a coal tar pitch, a resin, or a polymer. Silicone resins, such as those manufactured by General Electric and Dow-Corning give particularly good results where a highly hydrophobic carbon is desired. Other resins found suitable are epoxy resins such as the Epons manufactured by the Shell Resin Company, phenolformaldehyde, ureaformaldehyde, urethane, polyethylene, polyester, acrylate, and polystyrene resins. The choice of a proper resin depends to a large extent upon the carbon black and solvent employed in making the spraying composition as well as in application of the fuel cell electrode. It is only necessary that the resin provide a sprayable composition and a coherent film.

In actual practice, the binder, a volatile solvent such as methyl ethyl ketone, methyl isopropyl ketone, butanol, dimethyl foramide, a mixture of butanol and methyl ethyl ketone, dimethyl sulfoxide, etc. and the carbon black are admixed to provide a mixture which can be readily sprayed and will provide a coherent carbon film when carbonized. The mixture can be sprayed onto the metal screen to form a very thin layer and thereafter allow the solvent to evaporate, apply additional layers until a film of suitable thickness is built up on the metal screen and thereafter carbonize the film. Alternatively, it is possible to apply a layer of film to the screen, carbonize, apply a second layer to the screen, carbonize, etc. until a suitable film thickness is deposited on the screen. Further, it is possible, and at times highly desirable, to incorporate in the spray mixture a suitable metal catalyst. Metals which have been found particularly desirable are platinum, palladium, neodymium, rhodium, ruthenium, iron, gold, copper, silver, chromium and molybdenum. Film thickness on the metal screen are in the range of .001 to 1 mm. However, ordinarily films in the area of 0.01–0.15 mm. are preferred.

Carbonization techniques known in the art can be employed in the instant invention. For low temperature carbonization, temperatures ranging from about 400–600° C. are suitable. However, since carbonization is essentially a time and temperature relationship, temperatures can vary from as low as 200 up to 1350° C. and higher, depending upon the duration of the heating. Preferably the carbonization is carried out in an inert atmosphere, as for example, nitrogen, helium, or forming gas (10% hydrogen and 90% nitrogen).

The instant electrodes are operable in low temperature as well as high temperature fuel cells. However, inasmuch as carbon undergoes oxidation at high temperatures, if a fuel cell is to be operated above about 200° C. it is necessary to use oxidizing electrodes other than carbon. At the anode, carbon electrodes can be employed in fuel cells operating at temperatures in excess of 1000° C.

The instant electrodes, since they are relatively inert to chemical reaction, can be employed with virtually any electrolyte. Aqueous alkaline hydroxide and alkaline carbonate electrolytes as well as acid solutions have been found to be particularly suitable. However, any ionic conductor which remains substantially invariant under the operating conditions of the cell, can be employed.

Electrodes employing silicone resins as the binding agent have been found particularly satisfactory in fabricating electrodes which are highly hydrophobic and thus not subject to wetting by the electrolyte. Since the films have been carbonized usually in the range of 400° C. the electrode retains its hydrophobicity even during high temperature use. The electrodes, because of the supporting metal screen, can be fabricated as very thin plates and thus, the pore diameter can be controlled within relatively narrow limits. Since the electrodes are very thin there is little porosity of the type which would lead to concentration polarization during the operation with gases containing inert impurities. Thus, the electrodes have been found to be particularly effective as the oxidizing electrode employing air as the oxidant gas. It was usually necessary to use pure oxygen with the prior art carbons since they were readily susceptible to blocking.

Having described the general features of the invention, the following specific examples are set forth for specific illustration.

*Example 1*

10 parts Carbolac #2, a carbon black manufactured by Godfrey L. Cabot, of Boston, Mass., having a surface area of approximately 700 square meters per gram and a mean particle diameter of 143 angstrom, 45 parts silicone resin, which is a methyl phenyl siloxane having a viscosity of 200 centipoises at 60% solids dissolved in toluene, and 45 parts methyl ethyl ketone solvent were admixed and placed in a suitable sprayer. The mixture was then sprayed onto a 150 mesh platinum screen depositing a .01 mm. thick wet film. The solvent was allowed to evaporate and the spraying process repeated three times. The final screen had a film thickness of approximately 0.04 mm. The coated screen was then carbonized for one hour at 450° C. in a nitrogen atmosphere.

A fuel cell was constructed using a conventional platinum activated carbon at the anode and the sprayed carbon electrode, prepared above, as the cathode. An eight molar aqueous potassium hydroxide electrolyte, hydrogen fuel gas and air as the oxidant were employed in the cell. The cell, when operated at atmospheric pressure and 25° C. registered the following cathode half-cell performance characteristics:

| Polarization, volts: | Current density, ma./cm.$^2$ |
|---|---|
| .10 | 40 |
| .15 | 100 |
| .20 | 166 |
| .25 | 230 |

*Example 2*

15 parts of Black Pearls #2 manufactured by Godfrey L. Cabot, and having a surface area of approximately 290 square meters per gram and a mean particle diameter of 300 angstrom, 40 parts Epon 864, a polyepoxide resin marketed by Shell Chemical Corporation, prepared by the condensation in the presence of alkali of bis (4-hydroxyphenyl) isopropylidene with a molar excess of epichlorohydrin and characterized by a melting point of 40–45° C., an epoxide equivalent of 325 and an average molecular weight of 450, and 45 parts dimethyl formamide solvent were admixed and placed in a suitable sprayer. A metal platinum-rhodium alloy screen was sprayed to obtain a wet film thickness of approximately 0.1 mm. The coated screen was placed in an oven and carbonized at 450° C. for one hour in an inert atmosphere. The coated screen was sprayed with a second layer of the film and again carbonized for one hour at 450° C. Third and fourth layers were applied in a similar manner. The final product was a thin carbon plate approximately 0.03 mm. thick.

A fuel cell as described in Example 1 was constructed utilizing the prepared carbon at the cathode. The cell, when operated at 25° C. and atmospheric pressure using air as the oxidizing gas and hydrogen as the fuel gas, gave the following cathode performance characteristics:

| Polarization, volts: | Current Density ma./cm.$^2$ |
|---|---|
| .10 | 35 |
| .15 | 88 |
| .20 | 152 |
| .25 | 198 |

In Examples 1 and 2, the silicone and polyepoxide resin binders can be replaced by other resinous materials including hydrocarbons, terpenes, polyamide modified alkyds, polyurethanes, polyethylene resins, fusible phenolformaldehyde resins, fusible ureaformaldehyde resins, polyester resins, and polyethylene glycol resins. It is only necessary that the resin can be solubilized in the selected solvent and capable of forming a coherent film.

In Examples 1 and 2 the methyl ethyl ketone and dimethyl formamide solvent can be replaced by other solvents including chlorinated hydrocarbons, benzene, toluene, xylene, ethyl ether, di-isopropyl ether, hexyl ether, amyl acetate, 2-ethyl hexanol, cyclohexane, V.M. and P. naphtha, Stoddard's solvent, acetone, and dioxane. It is only necessary that the solvent be a relatively volatile organic material, compatible with the binder resin employed.

The ratio of carbon black, binder and solvent in the sprayable admixture is not critical. It is only necessary that the composition form a coherent film. However, usually the resinous binder comprises from 10 to 95% by weight of the carbon black-binder mixture. The selection of the proper proportions of solvent to form a sprayable composition is within the ability of one skilled in the art.

It should be appreciated that the instant invention is not to be construed as being limited by the illustrative examples. It is possible to produce still other embodiments without departing from the inventive concept herein disclosed. Such embodiments are within the ability of one skilled in the art.

What is claimed is:

1. A process for making improved fuel cell electrodes characterized in that a thin film of carbon is uniformly bonded to a conductive metal support screen, comprising the steps of (1) admixing a resinous binder, a volatile solvent for said resinous binder and carbon black, said solvent being present in an amount sufficient to provide a sprayable composition; (2) spraying a thin film of said admixture upon a metal support screen; (3) drying said film; and (4) heating said metal support screen and film at a temperature sufficient to carbonize said resinous binder; said electrode having an over-all thickness of from about 0.001 to 1 mm.

2. The process of claim 1 wherein the metal support screen has a mesh size of from about 10 to 325, and the over-all thickness of said electrode is from about 0.01 to 0.15 mm.

3. The process of claim 2 wherein the heating step is carried out at a temperature of from about 200 to 1350° C.

4. The process of claim 3 wherein the admixture of step 1 includes a minor amount of a catalytic metal uniformly dispersed therein.

5. The process of claim 4 wherein the spraying, drying, and carbonizing steps are repeated at least once.

References Cited
UNITED STATES PATENTS

| | | | |
|---|---|---|---|
| 2,384,463 | 9/1945 | Gunn et al. | 136—86 |
| 1,717,193 | 6/1929 | Dantsizen | 117—226 |
| 2,678,342 | 5/1954 | Porter | 136—126 |
| 2,805,274 | 9/1957 | Eisen | 136—120 |
| 2,664,453 | 12/1953 | Lang | 136—121.2 |
| 2,901,523 | 8/1959 | Justi et al. | 136—86 |
| 2,819,962 | 1/1958 | Salauze | 136—20 |
| 3,077,508 | 2/1963 | Oswin | 136—122 |
| 3,007,991 | 11/1961 | Duddy | 136—20 |
| 2,681,375 | 6/1954 | Vogt | 136—20 |
| 3,009,979 | 11/1961 | Corren et al. | 136—29 |
| 2,836,641 | 5/1958 | Vogt | 136—20 |

WINSTON A. DOUGLAS, *Primary Examiner.*

JOHN R. SPECK, *Examiner.*

H. FEELEY, *Assistant Examiner.*